United States Patent [19]
Oda et al.

[11] Patent Number: 6,143,811
[45] Date of Patent: *Nov. 7, 2000

[54] METHOD OF PRODUCING COMPOUND PELLETS CONTAINING WOOD FLOUR

[75] Inventors: Norimasa Oda; Yoshitaka Kimura; Kiyoshi Handa, all of Hiroshima, Japan

[73] Assignee: The Japan Steel Works, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/134,039

[22] Filed: Aug. 14, 1998

[51] Int. Cl.⁷ ................................... C08L 89/00
[52] U.S. Cl. ............................... 524/13; 524/14
[58] Field of Search ........................ 524/13, 14

[56] References Cited

U.S. PATENT DOCUMENTS

| | | | |
|---|---|---|---|
| 3,894,981 | 7/1975 | Kluglikov et al. | 524/13 |
| 4,203,876 | 5/1980 | Dereppe et al. | 524/13 |

Primary Examiner—Nathan M. Nutter
Attorney, Agent, or Firm—Sughrue, Mion, Zinn Macpeak & Seas, PLLC

[57] ABSTRACT

While resin forming material and hygroscopic wood flour or wood flour containing water, which were fed to the feed port 23 of the intermeshing type two screw type screw side feeder 20, are being conveyed toward the intermeshing type twin screw extruder 1, they are somewhat kneaded and then introduced into the intermeshing type twin screw extruder 1. Resin forming material and hygroscopic wood flour or wood flour containing water, which have been introduced into the intermeshing type twin screw extruder 1, are melted and kneaded by the heat transmitted from the heating cylinder 2 and also by the heat generated in the process of shearing conducted by the rotating screws 3a, 3b. After that, they are extruded from the die 9 in the form of strands. Moisture and gas composed of volatile components generated in the process of melting and kneading are sucked by vacuum from the rear vent 6a arranged on the upstream side of the introducing port 5 and also sucked by vacuum from the vents 6b, 6c arranged on the downstream side of the introducing port 5, so that they can be discharged outside the apparatus.

6 Claims, 2 Drawing Sheets

METHOD OF PRODUCING COMPOUND PELLETS CONTAINING WOOD FLOUR

BACKGROUND OF THE INVENTION

1. Field of the Invention

The present invention relates to a method of producing compound pellets containing wood flour in which wood flour is kneaded and dispersed in resin forming material.

2. Related Art

Forming a part of saving resources and preventing environmental pollution, in order to recycle waste wood and chips of wood, they are crushed, and the thus obtained hygroscopic wood flour or wood flour containing water is dried and then blended with resin forming material by a high speed blender, so that granular resin forming material compound containing wood flour can be obtained. Various products are formed from the thus obtained resin forming material compound containing wood flour.

However, according to the above prior art, after hygroscopic wood flour or wood flour containing water, which was obtained when waste wood or chips of wood was crushed, has been dried by a drier, it must be blended with resin forming material by a high speed blender. Therefore, the equipment cost is increased and further the productivity is low.

The present invention has been accomplished to solve the above problems of the prior art. It is an object of the present invention to realize a method of producing compound pellets containing wood flour characterized in that: it is possible to omit a drying process in which hygroscopic wood flour or wood flour containing water is dried; and it is also possible to continuously produce compound pellets containing wood flour.

SUMMARY OF THE INVENTION

In order to accomplish the above object, the present invention provides a method of producing compound pellets containing wood flour by a pellet producing apparatus including a screw type extruder, on the side of the heating cylinder of which an introducing port is provided, a screw type side feeder, the delivery side of which is connected with the introducing port, and a rear vent formed in the heating cylinder on the upstream side of the introducing port, the method of producing compound pellets containing wood flour comprising the steps of: introducing resin forming material and hygroscopic wood flour or wood flour containing water from the introducing port to the screw type extruder by feeding resin forming material and hygroscopic wood flour or wood flour containing water to the screw type side feeder; melting and kneading resin forming material and hygroscopic wood flour or wood flour containing water by the screw type extruder while gas generated in the process of melting and kneading is being sucked by vacuum from the rear vent and the vent provided on the downstream side of the rear vent so that gas is discharged outside the apparatus; and extruding in the shapes of strands and cutting into pellets.

The screw type extruder may be an intermeshing type twin extruder.

While resin forming material and hygroscopic wood flour or wood flour containing water, which were fed to the screw type side feeder, are being conveyed toward the screw type extruder, they are somewhat kneaded and then introduced into the screw type extruder. Resin forming material and hygroscopic wood flour or wood flour containing water, which have been introduced into the screw type extruder, are melted and kneaded by the heat transmitted from the heating cylinder and also by the heat generated in the process of shearing conducted in the screw type extruder. Moisture and gas composed of volatile components generated in the process of melting and kneading are sucked by vacuum from the rear vent arranged on the upstream side of the introducing port and also sucked by vacuum from the vent arranged on the downstream side of the introducing port, so that they can be discharged outside the apparatus. Due to the foregoing, a sudden change in pressure caused by the above gases in the screw type extruder can be suppressed. Therefore, it is possible to conduct a stable extrusion.

DETAILED DESCRIPTION OF THE PREFERRED EMBODIMENTS

Figure 1:
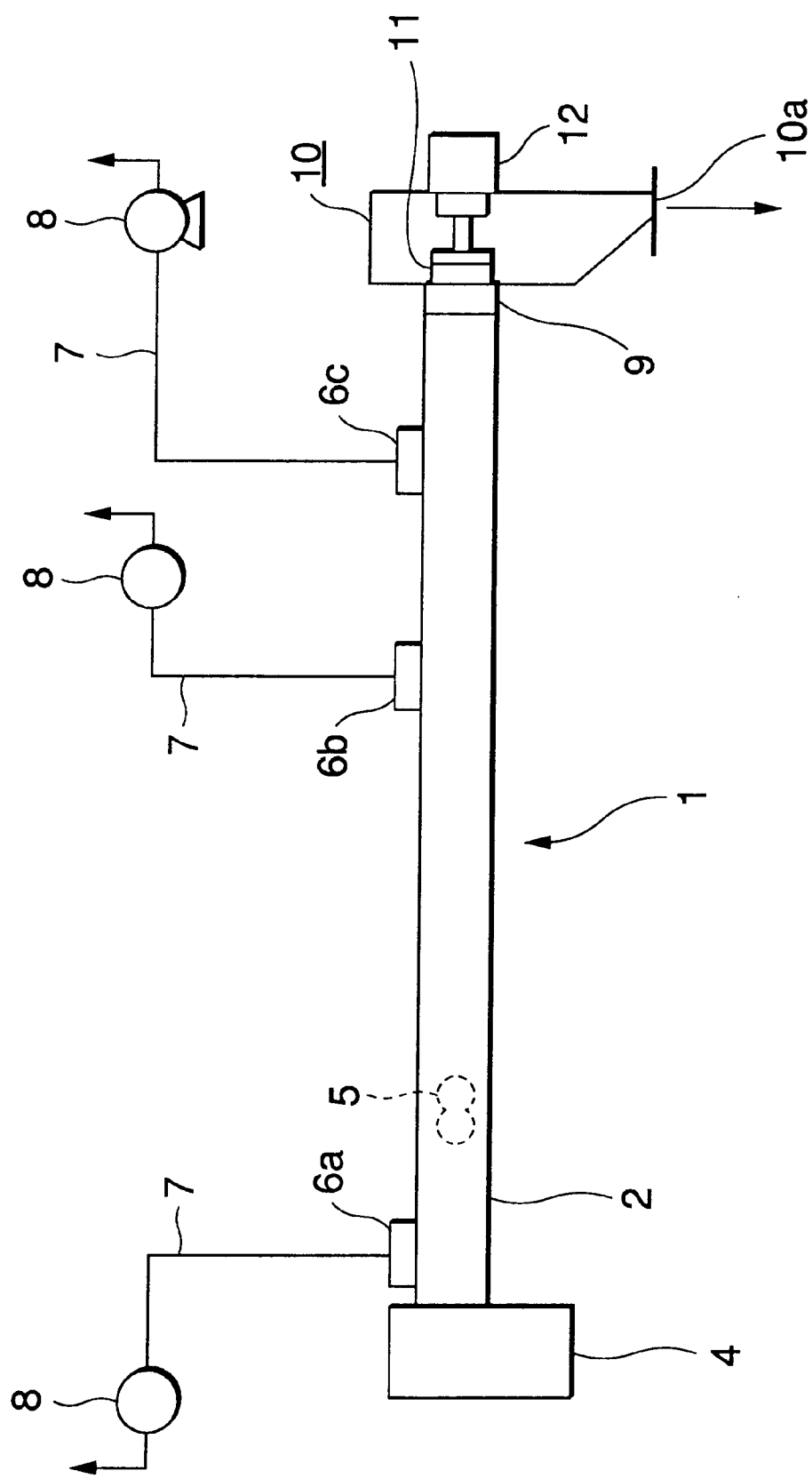
FIG. 1 is a schematic side view showing an example of the pellet producing apparatus provided with the screw type extruder used for executing the present invention.
Figure 2:
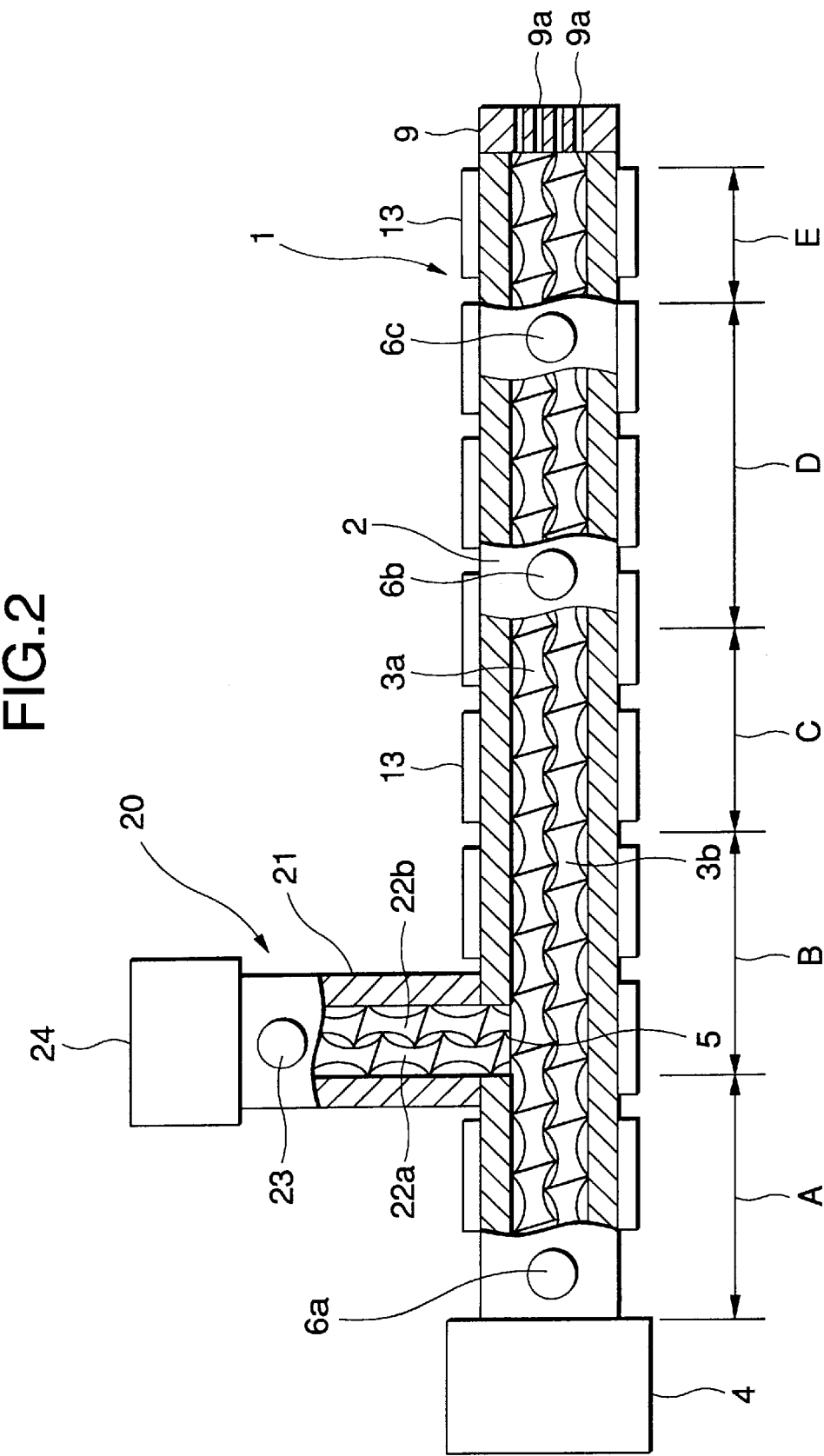
FIG. 2 is a partially cross-sectional schematic plan view showing a primary portion of the pellet producing apparatus shown in FIG. 1.

An embodiment of the present invention, in which a pellet producing apparatus shown in FIGS. 1 and 2 are used, will be explained below.

(1) There are provided two screws 3a, 3b in the heating cylinder 2 of the intermeshing type twin screw extruder 1. These two screws 3a, 3b are rotated by the rotation drive mechanism 4 in the same direction or the opposite direction. Rear degassing zone A on the upstream side of the introducing port 5 arranged on the side of the heating cylinder 2 is heated by the heating means 13 to a predetermined temperature. Also, solid conveying zone B, kneading zone C, degassing zone D and pressure rising zone E, which are successively arranged on the downstream side of the introducing port 5, are respectively heated by the heating means 13 to predetermined temperatures which are different from each other.

The delivery side of the intermeshing type twin screw type screw side feeder 20 is communicated with the introducing port 5. Two screws 22a, 22b, which are arranged in the cylinder 21 of the intermeshing type twin screw type screw side feeder 20, are rotated in the same direction or the opposite direction by the side feeder rotation driving mechanism 24.

(2) After the process described in the above item (1) has been completed, resin forming material and hygroscopic wood flour or wood flour containing water, the ratio of which is predetermined, are fed from the feed port 23 arranged in the cylinder 21 into the intermeshing type twin screw type screw side feeder 20.

It is possible to feed resin forming material and hygroscopic wood flour or wood flour containing water to the feed port 23 using a raw material feeder not shown in the drawing.

(3) While resin forming material and hygroscopic wood flour or wood flour containing water, which were fed to the intermeshing type twin screw type side feeder 20 in the manner described in the above item (2), are being conveyed toward the intermeshing type twin screw extruder 1, they are somewhat kneaded and then introduced from the introducing port 5 into solid body conveying zone B of the heating cylinder 2.

(4) While resin forming material and hygroscopic wood flour or wood flour containing water, which were introduced into solid conveying zone B of the heating cylinder 2 in the manner described in the above item (3), are being conveyed from solid conveying zone B toward kneading zone C by two rotating screws 3a, 3b, they are kneaded. In this process, water and a portion of volatile components are evaporated and changed into gas. This gas is sucked by the vacuum pump 8 connected with the rear vent 6a, which is arranged in rear deaerating zone A on the upstream side of the introducing port 5, via the vent pipe 7. The thus sucked gas is discharged outside the apparatus.

(5) Resin forming material and hygroscopic wood flour or wood flour containing water, which were conveyed into kneading zone C in the manner described in the above item (4), are melted and kneaded by the heat transmission from the heating cylinder 2 and the heat generated in the process of shearing conducted by the two rotating screws 3a, 3b and then conveyed to deaerating zone D.

(6) While resin forming material and hygroscopic wood flour or wood flour containing water, which were conveyed into deaerating zone D in the manner described in the above item (5), are being conveyed toward pressure rising zone E, residual water and volatile components generated from them are sucked by the vacuum pumps 8 respectively connected with the vent 6b arranged on the upstream side of degassing zone D and the vent 6c arranged on the downstream side via the vent pipes 7. Then the residual water and volatile components are discharged outside the apparatus.

(7) Resin forming material and hygroscopic wood flour or wood flour containing water, which were melted and kneaded in the process described in the above item (6), are more uniformly dispersed in pressure rising zone E and then extruded from a plurality of nozzles 9a of the die 9 into the cutting device 10 in the form of strands and then cut into pellets of a predetermined length by the cutter 11 rotated by the cutter drive mechanism 12.

The thus obtained pellets are discharged outside the apparatus from the discharge port 10a.

In this connection, in the present invention, single screw type extruder may be used instead of the above intermeshing type twin screw type extruder 1. Also, single screw type side feeder may be used instead of the intermeshing type twin screw type side feeder 20.

EXAMPLE 1

In this example, a pellet producing apparatus was used into which an intermeshing type twin screw extruder (manufactured by The Japan Steel Works, the brand name is TEX65α-42AW-3V) was incorporated, in which L/D was 42, the screw diameter was 69 mm and the number of vents was three including the rear vent. Hygroscopic wood flour of 50 weight %, the water content of which is 3 weight %, was fed to polypropylene (PP) pellets of 50 weight %, the melt index of which was 1.8, which was a resin forming material. By the same process as that described above, pellets of polypropylene-wood flour compound was produced.

EXAMPLE 2

The water content of hygroscopic wood flour was 10 weight % in this example, and other conditions were set to be the same as those of Example 1. In this way, pellets of polypropylene-wood flour compound were produced.

EXAMPLE 3

The water content of hygroscopic wood flour was 20 weight % in this example, and other conditions were set to be the same as those of Example 1. In this way, pellets of polypropylene-wood flour compound were produced.

EXAMPLE 4

The water content of hygroscopic wood flour was 30 weight % in this example, and other conditions were set to be the same as those of Example 1. In this way, pellets of polypropylene-wood flour compound were produced.

COMPARATIVE EXAMPLE 1

The rear vent was closed (no rear vent was provided) in this comparative example, and other conditions were set to be the same as those of Example 2. In this way, pellets of polypropylene-wood flour compound were produced.

COMPARATIVE EXAMPLE 2

In this comparative example, an introducing port was provided on the upper surface of the heating cylinder of the intermeshing type twin screw extruder (the intermeshing twin screw type side feeder was not provided), polypropylene and hygroscopic wood flour were fed from the introducing port. Other conditions were the same as those of Example 2. In this way, pellets of polypropylene-wood flour compound were produced.

Results of evaluation of Examples 1 to 4 and Comparative Examples 1 and 2 are shown on Table 1.

Since the present invention is composed as described above, the following effects can be provided.

According to the present invention, it is unnecessary to previously dry hygroscopic wood flour or wood flour containing water, and further it is possible to continuously produce compound pellets containing wood flour. Accordingly, the productivity can be remarkably enhanced.

TABLE 1

| | Rear vent | Feed of raw material | Water (wt %) | Screw speed (rpm) | Discharging capacity (kg/hr) | Discharging temperature (° C.) | Energy consumption (kw · hr/kg) |
|---|---|---|---|---|---|---|---|
| Example 1 | Yes | Side Feeder | 3 | 200 | 250 | 205 | 0.184 |
| Example 2 | Yes | Side Feeder | 10 | 200 | 250 | 197 | 0.178 |
| Example 3 | Yes | Side Feeder | 20 | 200 | 250 | 190 | 0.170 |
| Example 4 | Yes | Side Feeder | 30 | 200 | 200 | 195 | 0.176 |
| Comparative Example 1 | No | Side Feeder | 10 | 200 | Feed neck | — | — |
| Comparative Example 2 | Yes | Upper introducing port | 10 | 200 | 230–270 Fluctuation | 195–202 Fluctuation | 0182–0.179 Fluctuation |

What is claimed is:

1. A method of producing pellets using a screw type extruder having a heating cylinder with (1) an introducing port (2) an upstream vent located on an upstream side of said introducing port, and (3) a downstream vent located on a downstream side of said introducing port, said method comprising the steps of:

introducing a thermoplastic material and a wood flour through said introducing port and into said heating cylinder;

conveying said thermoplastic material and said wood flour toward a downstream end of said heating cylinder to heat and knead said thermoplastic material and said wood flour; and vacuum exhausting said heating cylinder via said upstream vent and said downstream vent.

2. A method of producing pellets according to claim 1, wherein the screw type extruder is an intermeshing type twin screw extruder.

3. A method of producing pellets according to claim 1, further comprising the steps of:

extruding said thermoplastic material and said wood flour into strands; and cutting said strands into pellets.

4. A method of producing pellets using a screw type extruder having a heating cylinder with (1) an introducing port (2) an upstream vent located on an upstream side of said introducing port, and (3) a downstream vent located on a downstream side of said introducing port, said method comprising the steps of:

introducing a resin and a wood flour through said introducing port and into said heating cylinder;

conveying said resin and said wood flour toward a downstream end of said heating cylinder to heat and knead said resin and said wood flour; and vacuum exhausting said heating cylinder via said upstream vent and said downstream vent.

5. A method of producing pellets according to claim 4, wherein the screw type extruder is an intermeshing type twin screw extruder.

6. A method of producing pellets according to claim 1, further comprising the steps of:

extruding said resin and said wood flour into strands; and cutting said strands into pellets.

* * * * *